April 18, 1933. J. D. MORGAN 1,904,070
COMBUSTION ENGINE WITH PREHEATED AIR
Filed Feb. 20, 1928
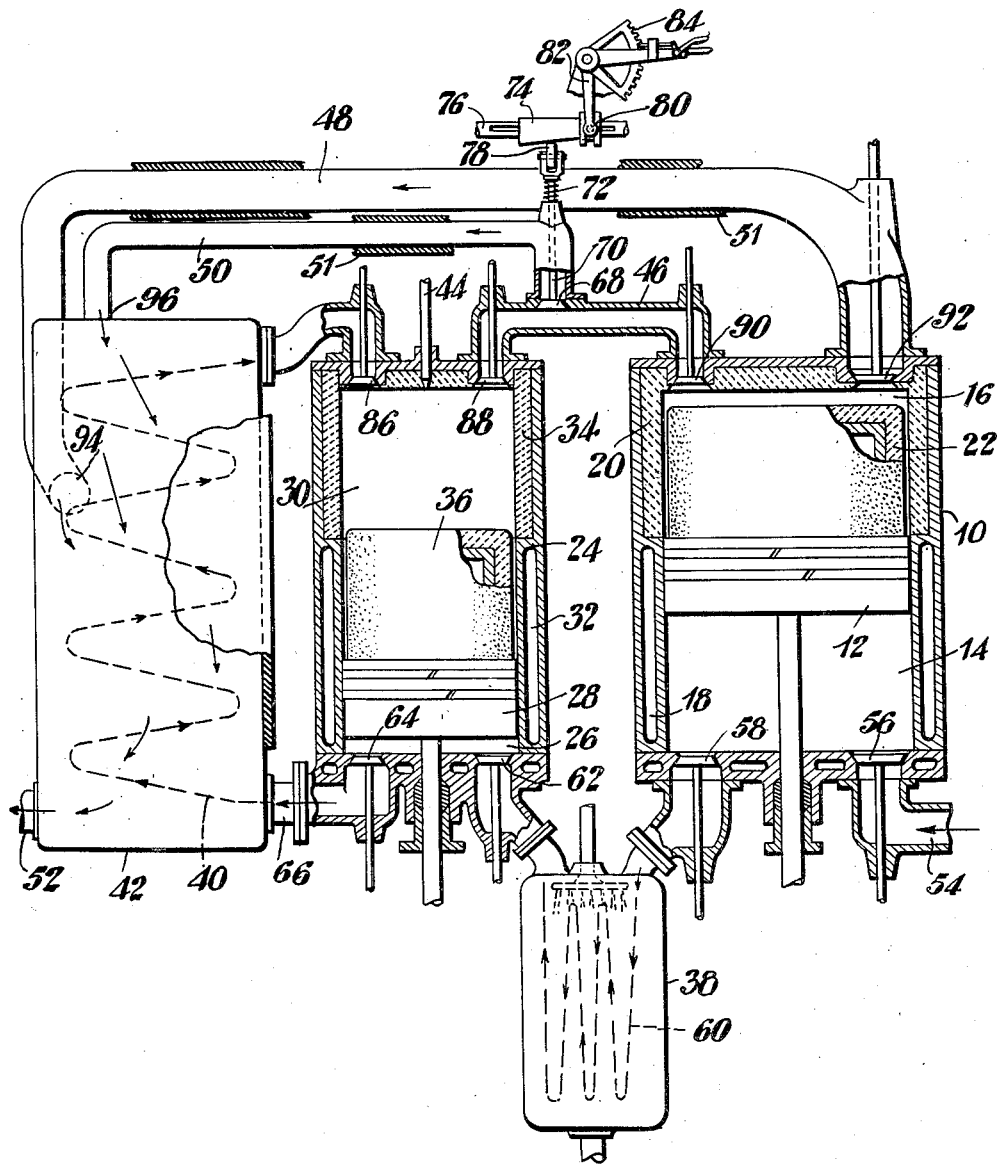
Inventor
JOHN D. MORGAN
By his Attorney
Edmund G. Borden Patented Apr. 18, 1933

1,904,070

UNITED STATES PATENT OFFICE

JOHN D. MORGAN, OF MAPLEWOOD, NEW JERSEY, ASSIGNOR TO DOHERTY RESEARCH COMPANY, OF NEW YORK, N. Y., A CORPORATION OF DELAWARE

COMBUSTION ENGINE WITH PREHEATED AIR

Application filed February 20, 1928. Serial No. 255,619.

This invention relates to the art of recuperative internal combustion engines.

It has been proposed to recover much of the heat ordinarily carried away by the gases exhausted from a combustion motor by using said gases in a recuperator to preheat the air of combustion. So far as known, schemes for recovering the heat of the exhaust have always involved the compression of the air of combustion externally of the combustion chamber. Usually a given recuperative combustion engine is designed with the idea of preheating the air to a certain definite temperature before introducing it into the combustion chamber.

It has been found however, that often the pre-compressed air of combustion is not raised in the recuperator to the desired temperature. There are several reasons why the temperature of the low pressure exhaust of a combustion engine may be too low and insufficient to cause the air in the recuperator to heat up to the temperature desired. Among these reasons may be a leanness of the mixture due to limitations imposed by the degree of reliability of fuel firing. Another reason may be excessive heat losses by conduction, convection and radiation, which may cool off the working fluid to below the required level of temperature. Again, the insufficiency of the recuperator of itself or of the piping may cause the air temperatures to be deficient.

It is the principal object of the present invention to provide a means and method for cheaply and readily increasing the temperature of the air delivered from the recuperator of a combustion motor power apparatus.

It has been found that the temperature of the air delivered by the recuperator of such an apparatus may be increased and regulated as desired by bleeding off a greater or less portion of the partially expanded gas of combustion to assist the exhaust gases in preheating the air of combustion.

In the accompanying drawing I have illustrated, by way of example, a specific apparatus according to the present invention.

In the drawing:

The figure is an elevational view partially diagrammatic in character of an internal combustion engine according to the present invention, parts being shown in section, and parts being broken away for purposes of illustration.

Referring to the drawing 10 is a low pressure cylinder containing a piston 12 which divides the cylinder into an air compression chamber 14 below the piston and an expansion chamber 16 above the piston. Preferably, the fixed or stationary walls of the chamber 14 are water-cooled as indicated at 18, and the fixed walls of the expansion chamber 16 are covered with a heat insulating layer or lining 20. Preferably also the piston 12 carries an extension 22 on the side toward the expansion chamber 16, the extension 22 being covered by a layer of heat-insulating refractory material similar to that used for the lining 20.

The high pressure cylinder of the engine is indicated at 24, cylinder 24 being constructed similarly in most particulars to the low pressure cylinder 10 and having an air chamber 26, piston 28, a combustion and expansion space 30, a water jacket 32, a refractory liner 34, and a heat insulated piston extension 36. Connected intermediate air chambers 14 and 26 is an intercooler 38. Connected to the high pressure air chamber 26 is an air heating coil 40 within the casing 42 of a recuperator, the coil 40 being connected to the combustion space 30. In the arrangement illustrated, fuel is injected into the combustion and expansion chamber 30 by a tube 44. Partially expanded gases are transferred from the chamber 30 to the chamber 16, through the connecting passage 46. The exhaust gases are transferred from the chamber 16 to the casing 42 of the recuperator through the pipe 48. Partially expanded gases may be transferred from the passage 46 to the top of the recuperator casing 42 through a pipe 50. It will be noted that the pipe 48 connects into the casing 42 at a materially lower point than the pipe 50. In the arrangement illustrated combustion gases discharge to the atmosphere from the casing 42 at the point 52.

In the operation of the apparatus, as illustrated, air of combustion is taken into the apparatus through the pipe 54 and enters the low pressure compression chamber 14 through an intake valve 56. On the discharge stroke of piston 12 air is forced out of the chamber 14 through the outlet valve 58 and into a cooling coil 60 in the inter-cooler 38. From the coil 60 the partially compressed air passes through inlet valve 62 into the high pressure compression chamber 26. On the compression or down-stroke of the piston 28, the air now fully compressed is forced out of chamber 26 through the outlet valve 64. After passing through the valve 64, the compressed air is conducted through pipe 66 to the heating coil 40 previously mentioned. In the coil 40, the air for combustion is heated to a desired temperature before being introduced into the space 30. The temperature which it is usually desired that the air attain before leaving the coil 40 is the ignition temperature of the fuel used in chamber 30. The temperature of ignition of the fuel of course varies to a considerable extent with the character of the fuel. Moreover, as indicated above, the final temperature of the air for combustion leaving coil 40 is affected by a number of other variables. According to the present invention, the air for combustion is preheated to the desired temperature, when the exhaust gases themselves are insufficient for the purpose, by introducing into the recuperator casing 42 partially expanded gases from the engine which are bled from the gases leaving the exhaust of the high pressure cylinder. For this purpose, a valve 68 is provided at the junction of the pipe 50 with the transfer passage 46. By controlling the valve 68 a greater or less amount of the partially expanded gases leaving chamber 30 are bled out of the ordinary course of circulation of the gases directly into the recuperator through the pipe 50. The valve 68 has a stem 70 which extends beyond the pipe 50 and a spring 72 surrounds the stem 70 on the outside of the pipe 50, spring 72 being adapted to hold valve 68 in closed position. The position of stem 70 and valve 68 is controlled in the arrangement illustrated by cam 74 on the shaft 76. The cam shaft 76 is rotated by means not shown from the cam or crank shaft of the engine which includes the cylinders 10 and 24. The cam 74 is splined to the shaft 76 and the valve stem 70 carries a roller 78 at its upper end adapted to contact with the cam 74 whereby the valve 68 may be opened more or less during each revolution depending upon the position of the cam 74. In order to vary the opening of the valve 68 as desired, the cam 74 is provided with a pin and groove connection 80 and with a bell crank 82 which may be set by hand and held by a toothed segment 84 in any desired position. When the bell crank 82 is moved, the cam 74 is shifted axially of the shaft 76 so that a different portion of the cam 74 will contact with a roller 78 thereby varying the opening of the valve 68. Ordinarily, not more than 40% of the gases discharged from the high pressure cylinder 24 is to be bled out through the valve 68 and pipe 50.

Gases which are not bled out of the passage 46 through pipe 50 pass into the expansion chamber 16 and are there more fully expanded and finally exhausted through the pipe 48. Valves 86 and 88 control the inlet of air and discharge of gases from chamber 30 of cylinder 24 and valves 90 and 92 control the intake and exhaust of gases to and from chamber 16.

Valves 56, 58, 62, 64, 86, 88, 90 and 92 are controlled by any preferred or known means, not shown, valve gear for internal combustion engines being well known forms of apparatus, and therefore not illustrated herein. Pistons 12 and 28 will be understood to be connected to a crank shaft in the usual manner and such connection is therefore not illustrated herein.

Referring again to the heating coil 40 in recuperator casing 42, it will be noted that the point 94 at which the pipe 48 discharges into the casing 42 is lower than the point 96 at which pipe 50 discharges into casing 42. As the air passes upwardly through the coil 40 and the gases pass downwardly around the coil in the casing 42, the air is first brought up approximately to the temperature of the exhaust gases which have been conducted from the low pressure chamber 16 to the casing 42 through pipe 48 and the air is then heated further to the desired temperature by the high temperature gases bled out of passage 46 through pipe 50 and which have been only partially expanded. The bleeding of gases from their normal course of expansion when only partially expanded, depending on its amount, must necessarily cut down the power of the engine for a given fuel input, i. e., lower the overall efficiency. But this effect is not at all proportional to the amount of power of the gases actually bled out. In the first place, the power of the high pressure cylinder tends to actually increase because the back-pressure tends to be lowered nearly in proportion to the gases bled out. The power of the low pressure cylinder, is however, reduced by a greater amount, but its heat loss is also reduced on account of the resulting lower mean cyclic gas temperatures and pressures.

In the second place, the recuperator receiving substantially more heat will deliver hotter air to the high pressure cylinder, thus returning some of the energy in the bled-out gases to be usefully applied in the high pressure cylinder.

The air heating feature of the process may be illustrated by the following example:

Assuming a compound engine utilizing preheated air of combustion at 1000° F. and 500 lbs. per sq. in. absolute pressure. If the air admitted per stroke to the high pressure cylinder is 0.06 cu. ft., this amounts to a weight of air of combustion of 0.056 lbs. it may be assumed that not more than 0.002 lb. of oil may be burned with this amount of air, as this allows only 100% excess of air over the theoretical requirement.

If the combustion should proceed at constant pressure and be followed by expansion with a conservative exponent of 1.35, then the exhaust will be at about 950° F. only, which is lower even than the 1000° F. required in the air of admission, as mentioned above. In order that the recuperator may furnish air at 1000° F., the gases at the end of the recuperator at which the air passes out of the recuperator should be at a temperature of about 1150° F. A deficiency of 200° F. in temperature can be compensated for by taking out some of the gas at the moment of transfer from the high pressure to the low pressure cylinders. Assume that 25% of the gas weight is bled out. After expanding down to the recuperator pressure it will have a temperature of about 950° F., the engine being assumed to have the proportions somewhat as illustrated in the drawing. If the 25% weight of the gas at 1900° F. will mix with the exhaust gases at 950° F., the temperature of the mixture will be above 1150° F. as required. However, slightly better efficiencies can be obtained if the bled gases are not mixed with the exhaust gases in the upper end of the recuperator casing but mixed with the exhaust gases only in the lower portion of the casing as is the case in the arrangement illustrated in the drawing and described above.

The loss of power occasioned by the procedure just described amounts to about 16%, so that if the original efficiency was 50% it will now be only about 42%.

The foregoing calculation on a rather severe example, shows that the efficiency is only moderatey affected by large amounts of bleeding and the drop in efficiency may be totally offset by the advantages gained.

It will be seen that I have disclosed the method and apparatus according to the present invention in connection with a compound engine. The invention is not limited to compound apparatus however.

It will be understood also that while I have disclosed by way of example a specific apparatus and method of operating the same, the invention itself is defined and limited solely by the appended claims.

Having thus described my invention, I claim:

1. The combination of an internal combustion motor, an air compressor, a recuperator, connections whereby compressed air from said compressor is conducted to said recuperator and from the recuperator to said motor, connections arranged to lead gases exhausted from said motor to said recuperator to heat the air therein, and connections arranged to bleed partially expanded gases from said motor and to lead the bled gases to said recuperator.

2. The combination set forth in claim 1 and in which the recuperator includes an arrangement whereby the bled gases enter the recuperator at a point nearer the exit therefrom of the air of combustion than do the exhaust gases.

3. The combination as set forth in claim 1 and in which the recuperator includes an arrangement whereby the air of combustion flows in the direction counter to that of the exhaust gases.

4. The combination of a combustion motor having a combustion chamber, means whereby air is compressed externally of said chamber, a recuperator for preheating air of combustion, connections whereby exhaust gases from said motor pass through said recuperator, connections whereby air compressed in said means is conducted through said recuperator in heat interchanging relation to said exhaust gases, means whereby gases are bled from said motor in a partially expanded condition and passed into and through said recuperator in heat interchanging relation to the air from said means, said recuperator and said connections being arranged so that the air from said means is in heat interchanging relation substantially solely with said bled gases in the region from which the air leaves the recuperator and connections whereby the air from said means is conducted from the recuperator into the combustion chamber of said motor.

5. The combination as set forth in claim 4 and in which the recuperator includes an arrangement whereby the air of combustion flows in the direction counter to that of the exhaust gases.

6. The combination of a combustion motor having a combustion space, a recuperator, means whereby gases are drawn from said motor at a point at which the pressure of the gases is higher than that at the final exhaust from the motor and whereby said partially expanded gases are passed into one end of said recuperator and through the recuperator in a longitudinal direction, means whereby the exhaust gases from said motor are passed into said recuperator at a point intermediate the point of admission of said partially expanded gases and the point of discharge of the gases from the recuperator, said recuperator being so arranged that the partially expanded gases and the final exhaust gases mingle and pass downwardly through the recuperator, means whereby air of combustion for said motor is compressed exteriorly of the combustion chamber of the motor and passed through said recuperator in direction counter to that of said gases and into the combustion space of the motor.

7. The combination of a combustion motor having a plurality of expansion stages, an air compressor, a recuperator, connections whereby compressed air from said compressor is conducted to said recuperator, and from the recuperator to said engine and connections arranged to bleed partially expanded products of combustion from a point between said expansion stages and to lead the bled gases to the recuperator.

In testimony whereof I affix my signature.

JOHN D. MORGAN.